United States Patent
Zhou et al.

(10) Patent No.: US 11,514,676 B2
(45) Date of Patent: Nov. 29, 2022

(54) METHOD AND APPARATUS FOR DETECTING REGION OF INTEREST IN VIDEO, DEVICE AND MEDIUM

(71) Applicant: BEIJING BAIDU NETCOM SCIENCE AND TECHNOLOGY CO., LTD., Beijing (CN)

(72) Inventors: Zhichao Zhou, Beijing (CN); Dongliang He, Beijing (CN); Fu Li, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 126 days.

(21) Appl. No.: 17/116,578

(22) Filed: Dec. 9, 2020

(65) Prior Publication Data

US 2021/0383120 A1    Dec. 9, 2021

(30) Foreign Application Priority Data

Jun. 5, 2020 (CN) .......................... 202010507871.8

(51) Int. Cl.
| | |
|---|---|
| *G06V 20/40* | (2022.01) |
| *G06T 7/246* | (2017.01) |
| *G06V 10/25* | (2022.01) |
| *G06V 10/75* | (2022.01) |

(52) U.S. Cl.
CPC .............. *G06V 20/40* (2022.01); *G06T 7/248* (2017.01); *G06V 10/25* (2022.01); *G06V 10/758* (2022.01)

(58) Field of Classification Search
CPC ...... G06V 10/25; G06V 20/40; G06V 10/758; G06T 7/248; G06T 2207/30241; G06T 2207/20084; G06T 2207/20081
See application file for complete search history.

(56) References Cited

U.S. PATENT DOCUMENTS

| | | | | |
|---|---|---|---|---|
| 2011/0081043 | A1* | 4/2011 | Sabol ...................... | G06T 7/254 382/103 |
| 2012/0294514 | A1* | 11/2012 | Saunders ............... | G06V 20/30 382/218 |
| 2014/0363044 | A1* | 12/2014 | Williams ............... | G06V 10/25 382/103 |
| 2015/0206004 | A1* | 7/2015 | Liang ...................... | G06T 7/248 382/103 |
| 2019/0325223 | A1* | 10/2019 | Chen ...................... | G06V 10/50 |

\* cited by examiner

*Primary Examiner* — Pinalben Patel
(74) *Attorney, Agent, or Firm* — Seed IP Law Group LLP (57) ABSTRACT

The present disclosure provides a method and apparatus for detecting a region of interest in a video, a device and a storage medium. The method may include: acquiring a current to-be-processed frame from a picture frame sequence of a video; detecting a region of interest (ROI) in the current to-be-processed frame, in response to determining that the current to-be-processed frame is a detection picture frame, to determine at least one ROI in the current to-be-processed frame; and updating a to-be-tracked ROI, based on the ROI in the current to-be-processed frame and a tracking result determined by a pre-order tracking picture frame; and tracking the current to-be-processed frame based on the existing to-be-tracked ROI, in response to determining that the current to-be-processed frame is a tracking picture frame, to determine at least one tracking result as the ROI of the current to-be-processed frame.

16 Claims, 4 Drawing Sheets

METHOD AND APPARATUS FOR DETECTING REGION OF INTEREST IN VIDEO, DEVICE AND MEDIUM

CROSS-REFERENCE TO RELATED APPLICATIONS

This patent application claims the priority to Chinese Patent Application No. 202010507871.8, filed on Jun. 5, 2020, and entitled "Method and apparatus for detecting region of interest in video, device and medium," the entire disclosure of which is hereby incorporated by reference.

TECHNICAL FIELD

The present disclosure relates to image processing technology, specifically to artificial intelligence computer vision technology, and more specifically to a method and apparatus for detecting a region of interest in a video, a device and a medium.

BACKGROUND

In the field of image processing, ROI (Region of Interest) is an image region selected from an image, and this region is the focus of your image analysis. Circle the region for further processing.

However, in the related art, when detecting ROI in an image, there is a problem of inaccurate detection result.

SUMMARY

Embodiments of the present disclosure provide a method and apparatus for detecting a region of interest in a video, a device and a medium, to improve the accuracy of ROI detection results in the video.

According to a first aspect, an embodiment of the present disclosure provides a method for detecting a region of interest in a video, the method including: acquiring a current to-be-processed frame from a picture frame sequence of a video; detecting a region of interest ROI in the current to-be-processed frame, in response to determining that the current to-be-processed frame is a detection picture frame, to determine at least one ROI in the current to-be-processed frame; and updating a to-be-tracked ROI, based on the ROI in the current to-be-processed frame and a tracking result determined by a pre-order tracking picture frame; and tracking the current to-be-processed frame based on an existing to-be-tracked ROI, in response to determining that the current to-be-processed frame is a tracking picture frame, to determine at least one tracking result as the ROI of the current to-be-processed frame.

According to a second aspect, an embodiment of the present disclosure provides an apparatus for detecting a region of interest in a video, the apparatus including: an acquisition module, configured to acquire a current to-be-processed frame from a picture frame sequence of a video; a detection module, configured to detect a region of interest ROI in the current to-be-processed frame, in response to determining that the current to-be-processed frame is a detection picture frame, to determine at least one ROI in the current to-be-processed frame; an update module, configured to update a to-be-tracked ROI, based on the ROI in the current to-be-processed frame and a tracking result determined by a pre-order tracking picture frame, in response to determining that the current to-be-processed frame is the detection picture frame; and a tracking module, configured to track the current to-be-processed frame based on the existing to-be-tracked ROI, in response to determining that the current to-be-processed frame is a tracking picture frame, to determine at least one tracking result as the ROI of the current to-be-processed frame.

According to a third aspect, an embodiment of the present disclosure provides an electronic device, including: at least one processor; and a memory, communicatively connected to the at least one processor. The memory stores instructions executable by the at least one processor, the instructions, when executed by the at least one processor, cause the at least one processor to perform the method for detecting a region of interest in a video according to the first aspect.

According to a fourth aspect, an embodiment of the present disclosure provides a non-transitory computer readable storage medium, storing computer instructions. The computer instructions is used to cause the computer to perform the method for detecting a region of interest in a video according to the first aspect.

The embodiments of the present disclosure acquire the current to-be-processed frame from the picture frame sequence of the video; detect the ROI in the current to-be-processed frame, in response to determining that the current to-be-processed frame is the detection picture frame, to determine at least one ROI in the current to-be-processed frame; and update the to-be-tracked ROI, based on the ROI in the current to-be-processed frame and the tracking result determined by the pre-order tracking picture frame; and track the current to-be-processed frame based on the existing to-be-tracked ROI, in response to determining that the current to-be-processed frame is the tracking picture frame, to determine at least one tracking result as the ROI of the current to-be-processed frame. The embodiments of the present disclosure adopt the above technical solution to improve the accuracy of ROI detection results in the video.

It should be understood that the content described in this section is not intended to identify key or important features of embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the present solution and do not constitute a limitation to the present disclosure.

DETAILED DESCRIPTION OF EMBODIMENTS

The following describes example embodiments of the present disclosure in conjunction with accompanying drawings, which includes various details of embodiments of the present disclosure to facilitate understanding, and they should be considered as merely as examples. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

Figure 1:
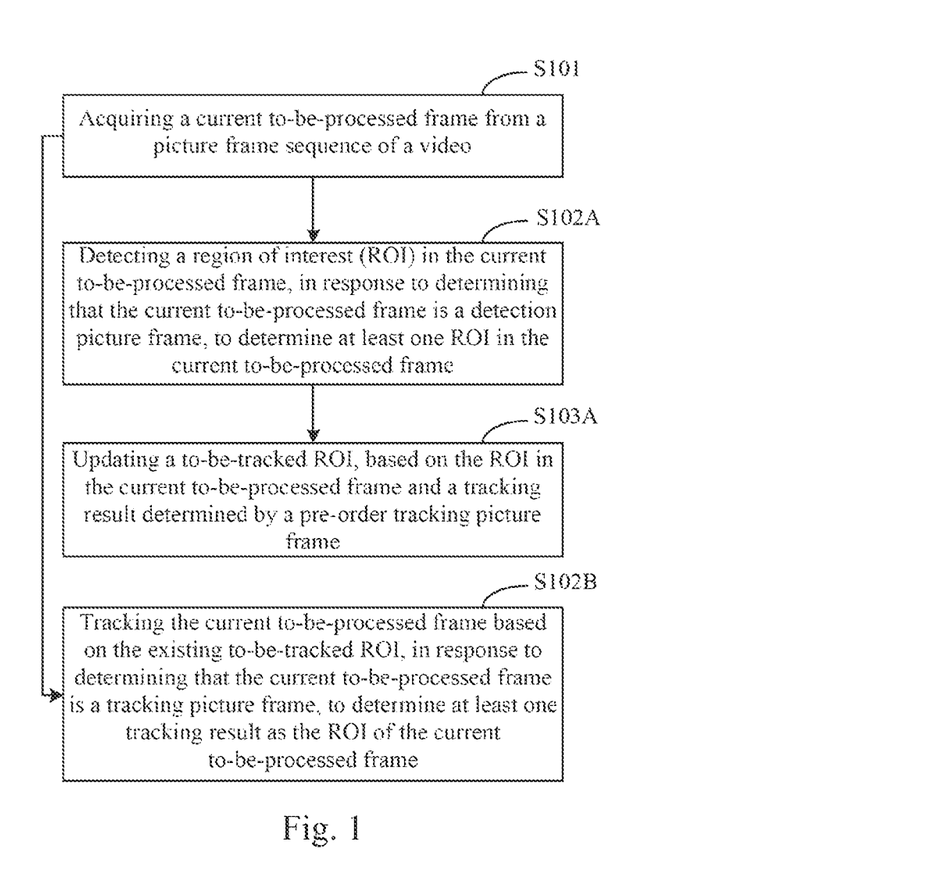
FIG. 1 is a flowchart of a method for detecting a region of interest in a video provided by an embodiment of the present disclosure.

FIG. 1 is a flowchart of a method for detecting a region of interest in a video provided by an embodiment of the present disclosure, the embodiment of the present disclosure is suitable for detecting the ROI of a picture frame in the video. The method is performed by an apparatus for detecting a region of interest in a video, the apparatus is implemented by software and/or hardware, and is specifically configured in an electronic device.

A method for detecting a region of interest in a video as shown in FIG. 1, includes the following steps.

S101, acquiring a current to-be-processed frame from a picture frame sequence of a video.

A video is a smooth and continuous sequence of picture frames obtained by combining a series of single frame static pictures. The region of interest, that is, ROI, refers to a region, that needs to be processed or paying attention to, outlined in a box, circle, ellipse, or irregular polygon from the picture frames of the picture frame sequence.

In order to facilitate the ROI detection in the video, the current to-be-processed frame may be acquired from the picture frame sequence of the video, then ROI detection is performed on each current to-be-processed frame separately, and finally ROI information of each picture frame in the video is obtained.

In an alternative embodiment of the embodiments of the present embodiment, the video may be stored locally in the electronic device, other storage devices associated with the electronic device or in the cloud in advance, and when needed, the picture frame sequence of the video is acquired from the local electronic device, other storage devices associated with the electronic device or the cloud, so as to detect ROI in each to-be-processed frame that is extracted one-by-one from the picture frame sequence.

In order to realize real-time processing of ROI, it is also possible to acquire collected picture frames from a video acquisition apparatus in real time in a process of video acquisition by the video acquisition apparatus, and use the acquired picture frames as the current to-be-processed frames for subsequent processing.

S102A, detecting a region of interest (ROI) in the current to-be-processed frame, in response to determining that the current to-be-processed frame is a detection picture frame, to determine at least one ROI in the current to-be-processed frame.

S103A, updating a to-be-tracked ROI, based on the ROI in the current to-be-processed frame and a tracking result determined by a pre-order tracking picture frame.

S102B, tracking the current to-be-processed frame based on the existing to-be-tracked ROI, in response to determining that the current to-be-processed frame is a tracking picture frame, to determine at least one tracking result as the ROI of the current to-be-processed frame.

The embodiment of the present disclosure divides the to-be-processed frame in the video into at least two categories, includes: the detecting picture frame, which represents performing subsequent ROI detection on this type of picture frame to acquire an ROI detection result; and further includes: the tracking picture frame, which represents performing subsequent object tracking on this type of picture frame to acquire an ROI detection result.

It may be understood that by performing ROI detection on the detection picture frame, a more accurate ROI detection result can be obtained. However, because the detection process takes a long time, it is possible to create a tracker for each ROI in the ROI detection result after the detection picture frame is detected and the ROI detection result is obtained, so as to track the ROI and obtain an ROI tracking result as the ROI detection result. Because the tracking algorithm has a faster calculation speed, it can greatly reduce the amount of data calculation in the ROI detection result and improve the detection efficiency.

However, in an ROI tracking process, there may be a new target appearing in the detection result or the target may be lost in the ROI tracking process, making the tracking result and the detection result unable to match well. As a result, situation of false detection and/or missed detection of the final determined ROI in the video appear, which further affects the accuracy of ROI detection results in the video.

In order to avoid the above situation, when it is determined that the current to-be-processed frame is the detection picture frame, the ROI in the current to-be-processed frame is detected to determine at least one ROI in the current to-be-processed frame. In addition, the to-be-tracked ROI is updated, based on the ROI in the current to-be-processed frame and the tracking result of the pre-order tracking picture frame, so that the to-be-tracked ROI matches the detection result of the current to-be-processed frame. As an example, at least one of the detection algorithms such as SSD (Single Shot MultiBox Detector), Yolo (You Only Look Once), or faster-rcnn (Faster Region Convolutional Neural Networks), may be used to detect the ROI in the detection picture frame.

It may be understood that by updating the to-be-tracked ROI using the ROI detection result of the detection picture frame and an ROI tracking result of the pre-order tracking picture frame, missed detection of the target caused by a newly added target in the video without tracking is avoided, and false detection of the target caused by tracking when the tracked target disappears in the video may also be avoided.

In response to determining that the current to-be-processed frame is the tracking picture frame, then the current to-be-processed frame based on the existing to-be-tracked ROI is tracked, to determine at least one tracking result as the ROI of the current to-be-processed frame, thereby realizing tracking of the existing target. As an example, Kalman filtering or correlation filtering algorithm, etc. may be used to track the existing to-be-tracked ROI in the tracking picture frame.

It should be noted that the ROI detection result in the detection picture frame includes size information and position information of a detection frame; and the ROI tracking result in the tracking picture frame includes size information and position information of a tracking frame. Finally, the ROI detection result and the ROI tracking result may be used as the ROI detection result of each picture frame in the video.

The embodiment of the present disclosure acquires the current to-be-processed frame from the picture frame sequence of the video; detects the ROI in the current to-be-processed frame, in response to determining that the current to-be-processed frame is the detection picture frame, to determine at least one ROI in the current to-be-processed frame; and updates the to-be-tracked ROI, based on the ROI in the current to-be-processed frame and the tracking result determined by the pre-order tracking picture frame; and tracks the current to-be-processed frame based on the existing to-be-tracked ROI, in response to determining that the current to-be-processed frame is the tracking picture frame, to determine at least one tracking result as the ROI of the current to-be-processed frame. The above technical solution uses the ROI detection result of the detection picture frame and the ROI tracking result of the pre-order tracking picture frame of the detection picture frame in the video to correct the to-be-tracked ROI, therefore, mismatch between the ROI tracking result and the ROI detection result is avoided, and the situation that missed tracking of a newly added ROI or false tracking of a disappeared ROI is avoided, thereby improving the accuracy of the ROI detection result. Because some picture frames use ROI detection to determine the ROI, and some other picture frames use object tracking to determine the ROI, the occupation of image processing computing resources by the detection algorithm may be reduced, and an ROI detection speed can be improved.

In an alternative embodiment of the embodiments of the present disclosure, the ROI detection result of the current to-be-processed frame may be directly used as the ROI detection result, and a tracking result of the current to-be-processed frame may be used as the ROI tracking result.

Due to the robustness of a tracking model or a detection model, the ROI detection results of continuous picture frames may have discontinuity or jitter, resulting in poor availability of the final determined ROI detection result. In order to reduce the influence of the foregoing situation, in another alternative embodiment of the embodiments of the present disclosure, after detecting or tracking the current to-be-processed frame, smoothing processing may further be performed on the detection result or the tracking result of the ROI of the current to-be-processed frame, based on a detection result or a tracking result of an ROI of an adjacent picture frame of the current to-be-processed frame.

In order to improve the accuracy of the final determined ROI detection result, smooth processing may be performed on the ROI detection result or the ROI tracking result in the following method: determining a weight of each adjacent picture frame, based on a frame spacing between the adjacent picture frame of the current to-be-processed frame and the current to-be-processed frame; and performing smoothing processing on the detection result or the tracking result of the ROI of the current to-be-processed frame, based on the weight of each adjacent picture frame and a detection result or a tracking result of an ROI of each adjacent picture frame.

The smaller the frame spacing between the adjacent picture frame and the current to-be-processed frame, the greater the weight; the greater the frame spacing between the adjacent picture frame and the current to-be-processed frame, the smaller the weight. The number of the adjacent picture frames is determined by those skilled in the art according to needs or experience. The adjacent picture frame may include an adjacent historical picture frame, and may further include an adjacent future picture frame.

For example, when determining the position of the $j^{th}$ frame of the $i^{th}$ box (corresponding to an ROI target), it may be obtained by averaging the weighted sum of the positions of the target in the previous (i–N) frame, the current frame, and the subsequent (i+N) frame.

It should be noted that in the process of tracking the ROI, when the target corresponding to the to-be-tracked ROI in the video disappears, the tracker created for the target is still in use, so false tracking may occur and affect the accuracy of the ROI tracking result. In order to avoid the influence of false tracking on the accuracy of the ROI detection result, after determining that the current to-be-processed frame is the detection picture frame, validity verification may be performed on the tracking result of the pre-order tracking picture frame based on the ROI in the current to-be-processed frame, so as to determine an invalid tracking result in the ROI tracking result of the pre-order tracking picture frame and eliminate it.

Accordingly, in order to improve the accuracy of the ROI detection result, when performing smoothing processing on the detection result or the tracking result of the ROI of the current to-be-processed frame, based on a detection result or a tracking result of an ROI of an adjacent picture frame of the current to-be-processed frame, smoothing processing may further be performed on the position of the ROI detection result or the tracking result of the current to-be-processed frame, based on the position of the detection result or an effective tracking result of the ROI of the adjacent picture frame of the current to-be-processed frame.

In an alternative embodiment of the embodiments of the present disclosure, the performing validity verification on the tracking result determined by the pre-order tracking picture frame based on the ROI in the current to-be-processed frame, may include: matching the ROI in the current to-be-processed frame with an ROI in a tracking result of an adjacent historical tracking picture frame; acquiring a confidence of the tracking result of each of the pre-order tracking picture frame, in response to that the matching fails; and verifying the tracking result of each of the pre-order tracking picture frame, based on the confidence. As an example, the Hungarian matching algorithm may be used to match the ROI in the current to-be-processed frame with the ROI in the tracking result of the adjacent historical tracking picture frame.

Specifically, if the ROI in the detection picture frame and the ROI in the tracking result of the adjacent historical tracking picture frame fail to match, it indicates that the target disappears in the adjacent historical tracking picture frame, but false tracking is caused by still continuous tracking, and the tracking result in this regard is obviously wrong. In this regard, the validity of the ROI tracking result may be verified by using the confidence of each tracking frame in the tracking result. For example, when the confidence is greater than a set confidence threshold, it is determined that the ROI tracking result is invalid; otherwise, it is determined that the ROI tracking result is valid. The set confidence threshold is set by those skilled in the art according to needs or experience, or determined through a large number of experiments.

In order to facilitate the storage and transmission of the video, the video is usually encoded and compressed to remove the redundancy in the spatial and temporal dimensions.

In an alternative embodiment of the embodiments of the present disclosure, after the ROI detection result in the video is determined, the video may further be encoded based on the ROI detection result to improve video encoding quality. As an example, different bite rates are allocated for the ROI and a non-ROI in the current to-be-processed frame; where a bite rate of the ROI is greater than a bite rate of the non-ROI; and the current to-be-processed frame is encoded based on an allocated bite rate.

It may be understood that in a traditional video encoding process, all regions in a picture frame are treated equally and have the same bite rate allocation ratio, so the video quality corresponding to the ROI is relatively poor. By treating the bite rate of the ROI and the non-ROI differently, and by allocating more bite rate to the ROI, the encoded video has higher image quality under the same bite rate than a traditional encoded video, and the video quality is improved.

Figure 2:
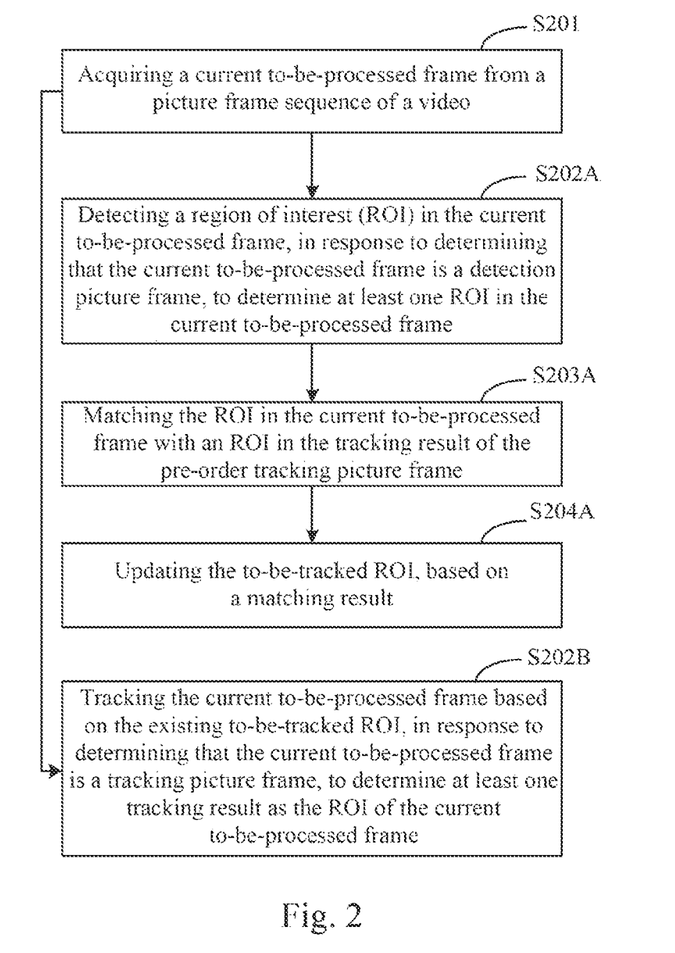
FIG. 2 is a flowchart of another method for detecting a region of interest in a video provided by an embodiment of the present disclosure.

FIG. 2 is a flowchart of another method for detecting a region of interest in a video provided by an embodiment of the present disclosure, the method is optimized and improved on the basis of the above technical solutions.

Further, the operation "updating a to-be-tracked ROI, based on the ROI in the current to-be-processed frame and a tracking result determined by a pre-order tracking picture frame" is refined into "matching the ROI in the current to-be-processed frame with an ROI in a tracking result of a pre-order tracking picture frame; and updating the to-be-tracked ROI, based on a matching result" to improve an update mechanism of the to-be-tracked ROI.

A method for detecting a region of interest in a video as shown in FIG. 2, includes the following steps.

S201, acquiring a current to-be-processed frame from a picture frame sequence of a video.

S202A, detecting a region of interest ROI in the current to-be-processed frame, in response to determining that the current to-be-processed frame is a detection picture frame, to determine at least one ROI in the current to-be-processed frame.

S203A, matching the ROI in the current to-be-processed frame with an ROI in the tracking result of the pre-order tracking picture frame.

As an example, the Hungarian matching algorithm may be used to match the ROI in the current to-be-processed frame with the ROI in the tracking result of the pre-order tracking picture frame.

In an alternative embodiment of the embodiments of the present disclosure, determining an intersection over union of the ROI in the current to-be-processed frame and the ROI in the tracking result of the pre-order tracking picture frame; and determining a matching situation between each ROI in the current to-be-processed frame and each ROI in the tracking result of the pre-order tracking picture frame, based on each of the intersection over union.

As an example, determining an intersection over union of a detection frame in an ROI detection result of the detection picture frame and a tracking frame in an ROI tracking result of the pre-order tracking picture frame; and determining a matching situation between the ROI detection result of the detection picture frame and the tracking result of the pre-order tracking picture frame, based on an intersection over union of each detection frame and each tracking frame. The matching situation includes: the detection frame matches one of the tracking frames; the detection frame does not match each tracking frame; and the tracking frame does not match each detection frame.

S204A, updating the to-be-tracked ROI, based on a matching result.

Alternatively, if the current ROI in the current to-be-processed frame fails to match each ROI in the tracking result of the pre-order tracking picture frame, it indicates that a new target appears in the video during the tracking. Therefore, it is necessary to add the current ROI to the to-be-tracked ROI in order to create a tracker for the new target for tracking, so as to reduce the occurrence of missed ROI detection in the video, thereby improving the accuracy of the ROI detection result.

Alternatively, if the current ROI in the current to-be-processed frame successfully matches any ROI in the tracking result of the pre-order tracking picture frame, it indicates that there is no false tracking or missed tracking of the tracked target, so that the to-be-tracked ROI is kept unchanged, so that the to-be-tracked ROI can be tracked continuously.

Alternatively, if the current ROI in the tracking result of the pre-order tracking picture frame fails to match each ROI in the current to-be-processed frame, it indicates that the tracked target in the video already disappeared, but the tracker of the target is still used for tracking processing, thus false tracking occurs. Therefore, the current ROI needs to be deleted from the to-be-tracked ROI, in order to stop the false tracking in time, to reduce the waste of computing resources, and improve the accuracy of the ROI detection result.

S202B, tracking the current to-be-processed frame based on the existing to-be-tracked ROI, in response to determining that the current to-be-processed frame is a tracking picture frame, to determine at least one tracking result as the ROI of the current to-be-processed frame.

The embodiment of the present disclosure refines the tracking process to the to-be-tracked ROI into matching the ROI in the current to-be-processed frame with the ROI in the tracking result of the pre-order tracking picture frame; updating the to-be-tracked ROI, based on the matching result, thereby improving the update mechanism of the to-be-tracked ROI, and providing a guarantee for the accuracy of video region of interest detection results.

Figure 3:
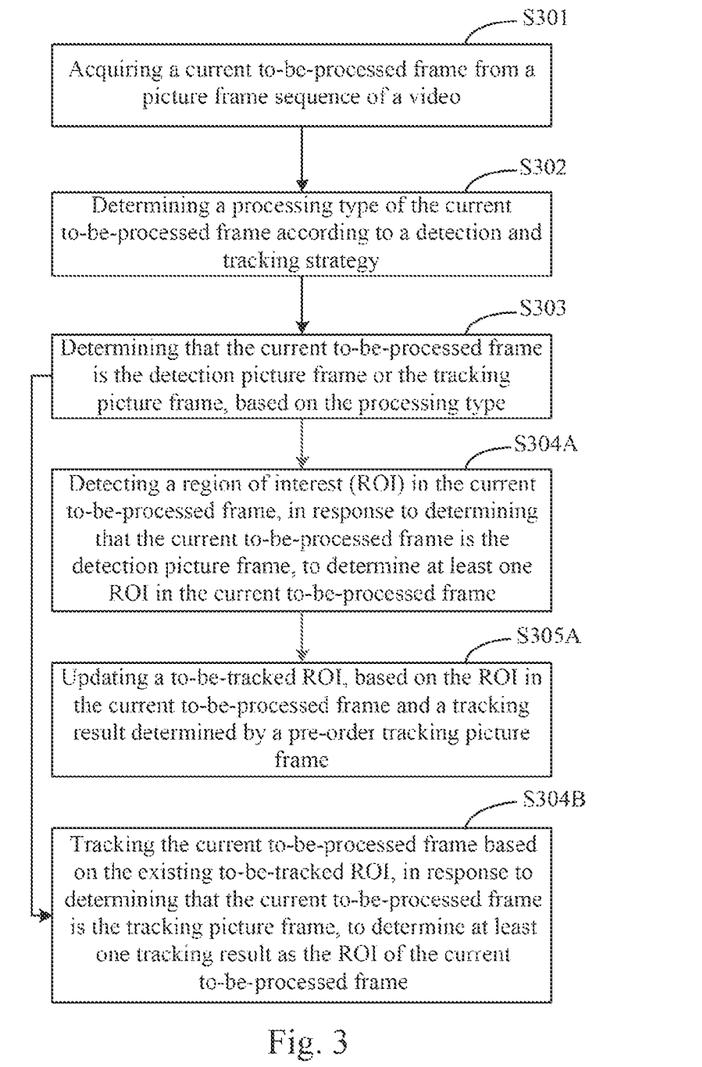
FIG. 3 is a flowchart of another method for detecting a region of interest in a video provided by an embodiment of the present disclosure.

FIG. 3 is a flowchart of another method for detecting a region of interest in a video provided by an embodiment of the present disclosure, the method is optimized and improved on the basis of the technical solutions of the above embodiments.

Further, in the process of performing the method for detecting a region of interest in a video, adding "determining a processing type of the current to-be-processed frame according to a detection and tracking strategy; and determining that the current to-be-processed frame is the detection picture frame or the tracking picture frame, based on the processing type; where, the processing type includes a detection type and a tracking type" to improve a determination mechanism of the detection picture frame and the tracking picture frame.

A method for detecting a region of interest in a video as shown in FIG. 3, includes the following steps.

S301, acquiring a current to-be-processed frame from a picture frame sequence of a video.

S302, determining a processing type of the current to-be-processed frame according to a detection and tracking strategy.

The processing type includes a detection type and a tracking type.

In an alternative embodiment of the embodiments of the present disclosure, based on a frame number of the current to-be-processed frame, it is determined that the processing type of the current to-be-processed frame is the detection type or the tracking type.

As an example, the frame number of the picture frame corresponding to each detection type and each tracking type is preset, and the processing type of each picture frame is marked. Correspondingly, based on the frame number of the current to-be-processed frame, it is determined that the current to-be-processed frame is the detection type or the tracking type.

For example, the $i^{th}$ picture frame in the picture frame sequence of the video is preset as the detection type; there are N tracking type picture frames between two adjacent picture frames of the detection type. Here, N may be determined by those skilled in the art according to needs or experience. For example, N is five. Take N being 5 as an example. When it is determined that the frame number of the current to-be-processed frame is i+2, the processing type of the current to-be-processed frame is determined to be the tracking type; and when it is determined that the frame number of the current to-be-processed frame is i+6, the processing type of the current to-be-processed frame is determined to be the detection type.

The above alternative embodiment may be applied to the situation of real-time or offline video acquisition. In a scenario of real-time video acquisition, since the number of picture frames in the video cannot be determined, the accuracy of a cumulative number of the picture frames in real time cannot be guaranteed. In order to avoid the occurrence of confusion in ROI detection of a picture frame due to incorrect frame number accumulation, in another alternative embodiment of the embodiments of the present disclosure, the processing type of the current to-be-processed frame may further be determined in the following method: determining that the processing type of the current to-be-processed frame is the detection type, in response to a frame interval between the current to-be-processed frame and a previous detection picture frame being a set number threshold; and determining that the processing type of the current to-be-processed frame is the tracking type, in response to the frame interval between the current to-be-processed frame and the previous detection picture frame being not the set number threshold. The set number threshold is set by those skilled in the art according to needs or experience, or determined through a large number of experiments.

S303, determining that the current to-be-processed frame is the detection picture frame or the tracking picture frame, based on the processing type.

As an example, in response to the current to-be-processed frame being the detection type, then the current to-be-processed frame is determined as the detection picture frame; and in response to the current to-be-processed frame being the tracking type, the current to-be-processed frame is determined as the tracking picture frame.

S304A, detecting a region of interest ROI in the current to-be-processed frame, in response to determining that the current to-be-processed frame is the detection picture frame, to determine at least one ROI in the current to-be-processed frame.

S305A, updating a to-be-tracked ROI, based on the ROI in the current to-be-processed frame and a tracking result determined by a pre-order tracking picture frame.

S304B, tracking the current to-be-processed frame based on the existing to-be-tracked ROI, in response to determining that the current to-be-processed frame is the tracking picture frame, to determine at least one tracking result as the ROI of the current to-be-processed frame.

It should be noted that since changes between consecutive picture frames in the video are often small, there is a certain degree of redundancy in the picture frames of the video. ROI detection or tracking of the video frame by frame may bring certain computational redundancy. In order to reduce the amount of data calculation in the ROI detection process, a skip type may further be introduced into the processing type. Correspondingly, after the processing type of the current to-be-processed frame is determined, a detection result of ROI of a pre-order picture frame of the current to-be-processed frame is used as an ROI detection result of the current to-be-processed frame, in response to the current to-be-processed frame being of the skip type. For example, an ROI detection result of a pre-order detection picture frame is used as an ROI tracking result of the current tracking picture frame; an ROI tracking result of a pre-order tracking picture frame is used as the ROI tracking result of the current tracking picture frame; or the ROI tracking result of the pre-order tracking picture frame is used as the ROI detection result of the current detection picture frame.

In an alternative embodiment of the embodiments of the present disclosure, the determining a processing type of the current to-be-processed frame according to a detection and tracking strategy, may include: extracting respectively picture features of the pre-order picture frame of the current to-be-processed frame and the current to-be-processed frame to obtain feature vectors; determining a similarity between the two feature vectors; and in response to the similarity being less than a set similarity threshold, determining that the processing type of the current to-be-processed frame is the skip type. The set similarity threshold may be set by those skilled in the art according to needs or experience, and may also be determined by repeated experiments.

It should be noted that determining whether the processing type of the current to-be-processed frame is the skip type using a similarity determination method is highly dependent on the accuracy of feature vector extraction. Generally, a large number of training samples may be used to train a machine learning model or deep learning model, and the trained machine learning model or deep learning model may be used for feature extraction for similarity determination, which requires a lot of initial investment.

In order to reduce the initial investment in determining the skip type and at the same time ensure the accuracy of determination result of the skip type, in an alternative embodiment of the embodiments of the present disclosure, the determining a processing type of the current to-be-processed frame according to a detection and tracking strategy, may alternatively include: determining a degree of difference between the pre-order picture frame of the current to-be-processed frame and the current to-be-processed frame; and determining that the processing type of the current to-be-processed frame is the skip type, in response to the degree of difference being less than a set difference degree threshold. The set difference degree threshold is set by those skilled in the art according to needs or experience, or determined through a large number of experiments.

As an example, a histogram distance between the pre-order picture frame of the current to-be-processed frame and the current to-be-processed frame may be determined, and the histogram distance may be used as the degree of difference. Alternatively, the histogram distance may be a color histogram distance.

It may be understood that by introducing the degree of difference between adjacent picture frames, the degree of change between the adjacent picture frames is represented. When the degree of difference is less than the set difference degree threshold, it indicates that the change between the adjacent picture frames is small. The skip method may be used to replace ROI detection or ROI tracking, and the detection result of the pre-order picture frame may be directly used as the detection result of the current to-be-processed frame. When the degree of difference is not less than the set difference degree threshold, it indicates that the change between the adjacent picture frames is large. If the detection result of the pre-order picture frame is directly used as the detection result of the current to-be-processed frame, it may lead to the occurrence of ROI missed detection, so the skip method can not replace the ROI detection or the ROI tracking.

In the embodiment of the present disclosure, determining the processing type of the current to-be-processed frame according to the detection and tracking strategy is added in the ROI detection process, where the processing type includes the detection type and the tracking type; according to the processing type, the current to-be-processed frame is determined as the detection picture frame or the tracking picture frame. Using the above technical solution, the determination mechanism of the detection picture frame and the tracking picture frame is improved, thereby laying a foundation for subsequent selection of the ROI detection or the ROI tracking.

Figure 4:
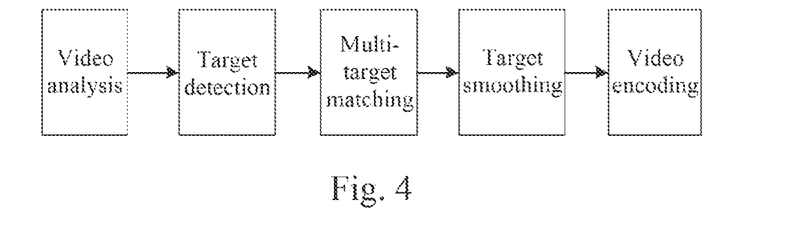
FIG. 4 is a block diagram of a video region of interest detection process provided by an embodiment of the present disclosure.

On the basis of the foregoing technical solutions, the embodiment of the present disclosure also provides a preferred embodiment. With reference to FIG. 4, a block diagram of a video region of interest detection process provided by an embodiment of the present disclosure is provided as an example description.

The video region of interest detection process includes five stages: video analysis, target detection, multi-target matching, target smoothing, and video encoding.

1. Video Analysis Stage acquiring video data and analyzing the video data to obtain a picture frame sequence.

The video may be a video acquired in real time or may be an offline video.

2. Target Detection Stage

1) Detection

Performing ROI detection on the $i^{th}$ picture frame, and recording position information of a detection frame as a detection result.

Here, at least one of the detection algorithms such as SSD, Yolo, and faster-rcnn may be used to perform ROI detection on the picture frame.

Here, the position information of the detection frame includes the coordinates of a reference point and the size of the detection frame.

2) Tracking

Creating a tracker for ROI tracking of the $(i+1)^{th}$ to $(i+n)^{th}$ picture frames, and recording position information of a tracking frame as the detection result.

Here, n may be set by those skilled in the art according to needs or experience, and may also be determined by repeated experiments. For example, n may be five.

Here, at least one of the tracking algorithms such as Kalman filtering or correlation filtering may be used to perform ROI tracking on the picture frame.

It may be understood that because the tracking algorithm is often faster than the detection algorithm, ROI tracking is used to replace part of the ROI detection for ROI detection, which can improve the efficiency of ROI detection.

3) Skipping

Before detecting or tracking the picture frame, determining a degree of difference between the current picture frame and a previous picture frame; and in response to the degree of difference being less than a set threshold, using a detection result of the previous picture frame as the detection result of the current picture frame.

Here, a color histogram distance of two adjacent picture frames may be calculated, and a calculation result is used as the degree of difference.

Here, the set threshold may be set by those skilled in the art according to needs or experience, and may also be determined by repeated experiments.

Due to large amount of data redundancy in the video, the picture frames of consecutive frames often change very little. Therefore, frame-by-frame detection may bring a large amount of calculation, and skipping may be used to replace detection and/or tracking, then the amount of data calculation may be reduced, thereby improving the efficiency of ROI detection.

3. Multi-Target Matching Stage

Detecting the $(i+n+1)^{th}$ picture frame, and recording position information of a detection frame as the detection result; matching the detection frame in a detection result of the $(i+n+1)^{th}$ picture frame with a tracking frame in a detection result of the $(i+1)^{th}$ to $(i+n)^{th}$ picture frames to obtain a matching result; and determining a corresponding processing strategy, based on different matching results.

Here, matching the detection frame (N frames) of the $(i+n+1)^{th}$ picture frame with the tracking frame (M) of the $(i+1)^{th}$ to $(i+n)^{th}$ picture frames, may include: determining a matching distance between each detection frame and each tracking frame according to a matching algorithm, and determining a matching result based on the matching distance.

Here, the matching distance is an intersection over union (IoU) between the frames; and the matching algorithm may be the Hungarian algorithm, etc.

Here, the determining a corresponding processing strategy, based on different matching results, includes the following.

1) matching detection frame+tracking frame, continue tracking and detection, and recording the detection result;

2) unmatched detection frame, indicating that the target in the detection frame is a new target, creating a tracker to track the target;

3) unmatched tracking frame, indicating that a previous tracking target has not been detected in the current picture frame, that is, the tracked target has been lost, a previous tracking result expires and will be deleted, and the corresponding tracker stops tracking.

Here, deleting the tracking result, may include the following.

1) directly deleting tracking results of the $(i+1)^{th}$ to $(i+n)^{th}$ picture frames; or, 2) determining a tracking result having a confidence less than a set confidence threshold in the tracking results of the $(i+1)^{th}$ to $(i+n)^{th}$ picture frames, and deleting only the tracking result that meets the above condition.

Here, the set confidence threshold may be set by those skilled in the art according to needs or experience, and may also be determined by repeated experiments.

4. Target Smoothing Stage

For a target in the $j^{th}$ frame in the $i^{th}$ picture frame, performing smoothing processing based on detection results of the target in the previous $(i-N)^{th}$ picture frames and detection results in the subsequent $(i+N)^{th}$ picture frames to obtain a detection result of the target in the $i^{th}$ picture frame.

Here, the smoothing processing may include: performing a weighted average of the detection results of the target in the $(i-N)^{th}$ to $(i+N)^{th}$ picture frames to obtain the detection result of the target in the $i^{th}$ picture frame.

The weight is determined by a distance between the frame number and the $i^{th}$ frame. The closer the distance, the greater the weight. For example, the Gaussian algorithm may be used to determine the weight based on the frame number distance.

Here, N is an empirical value, which may be set in conjunction with video transmission delay and/or tracking delay, which may be 10.

5. Video Encoding Stage

For each picture frame, adjusting bite rates of an ROI area and other areas based on the ROI detection result; and encoding the video based on an allocated bite rate.

Here, the bite rate of the ROI area is higher than that of other areas.

It should be noted that if the video is a real-time acquired video, the detection process is realized by serial processing; and if the video is an offline video, the detection process may segment the corresponding picture frames of the video, and parallel processing may be used to process each segment of picture frame sequence.

The embodiment of the present disclosure partially replaces ROI detection by ROI tracking, which improves the efficiency of ROI detection. Further, correcting the ROI that needs to be tracked based on the ROI detection result can reduce ROI false detection and missed detection, and improve the accuracy of the ROI detection result. Furthermore, by replacing part of the ROI detection and/or tracking by skipping, it further improves the efficiency of ROI detection. Further, the ROI detection result is determined by smoothing, which avoids the discontinuity or jitter of detection results of consecutive frames, resulting in poor detection result accuracy, and further improves the accuracy of the detection result.

Figure 5:
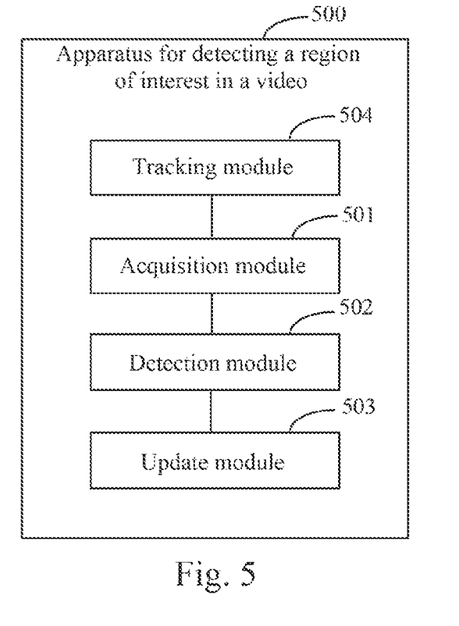
FIG. 5 is a structural diagram of an apparatus for detecting a region of interest in a video provided by an embodiment of the present disclosure.

FIG. 5 is a structural diagram of an apparatus for detecting a region of interest in a video provided by an embodiment of the present disclosure, the apparatus is implemented by software and/or hardware, and is specifically configured in an electronic device.

As shown in FIG. 5, an apparatus 500 for detecting a region of interest in a video includes: an acquisition module 501, a detection module 502, an update module 503, and a tracking module 504.

The acquisition module 501 is configured to acquire a current to-be-processed frame from a picture frame sequence of a video.

The detection module 502 is configured to detect a region of interest ROI in the current to-be-processed frame, in response to determining that the current to-be-processed frame is a detection picture frame, to determine at least one ROI in the current to-be-processed frame.

The update module 503 is configured to update a to-be-tracked ROI, based on the ROI in the current to-be-processed frame and a tracking result determined by a pre-order tracking picture frame, in response to determining that the current to-be-processed frame is the detection picture frame.

The tracking module 504 is configured to track the current to-be-processed frame based on the existing to-be-tracked ROI, in response to determining that the current to-be-processed frame is a tracking picture frame, to determine at least one tracking result as the ROI of the current to-be-processed frame.

In the embodiment of the present disclosure, the acquisition module acquires the current to-be-processed frame from the picture frame sequence of the video; the detection module detects the ROI in the current to-be-processed frame, in response to determining that the current to-be-processed frame is the detection picture frame, to determine at least one ROI in the current to-be-processed frame; and the update module updates the to-be-tracked ROI, based on the ROI in the current to-be-processed frame and the tracking result determined by the pre-order tracking picture frame; and the tracking module tracks the current to-be-processed frame based on the existing to-be-tracked ROI, in response to determining that the current to-be-processed frame is the tracking picture frame, to determine at least one tracking result as the ROI of the current to-be-processed frame. The above technical solution uses the ROI detection result of the detection picture frame and the ROI tracking result of the pre-order tracking picture frame of the detection picture frame in the video to correct the to-be-tracked ROI, therefore, mismatch between the ROI tracking result and the ROI detection result is avoided, and the situation that missed tracking of a newly added ROI or false tracking of a disappeared ROI is avoided, thereby improving the accuracy of the ROI detection result. Because some picture frames use ROI detection to determine the ROI, and some other picture frames use object tracking to determine the ROI, the occupation of image processing computing resources by the detection algorithm may be reduced, and an ROI detection speed can be improved.

Further, the update module 503 includes: a matching unit, configured to match the ROI in the current to-be-processed frame with an ROI in the tracking result of the pre-order tracking picture frame; and an update unit, configured to update the to-be-tracked ROI, based on a matching result.

Further, the update unit includes: an adding subunit, configured to add the current ROI to the to-be-tracked ROI, in response to that the current ROI in the current to-be-processed frame fails to match each ROI in the tracking result of the pre-order tracking picture frame; a keeping subunit, configured to keep the to-be-tracked ROI unchanged, in response to that the current ROI in the current to-be-processed frame is successfully matched with any ROI in the tracking result of the pre-order tracking picture frame; and a deleting subunit, configured to delete the current ROI from the to-be-tracked ROI, in response to that the current ROI in the tracking result of the pre-order tracking picture frame fails to match each ROI in the current to-be-processed frame.

Further, the matching unit includes: an intersection over union determination subunit, configured to determine an intersection over union of the ROI in the current to-be-processed frame and the ROI in the tracking result of the pre-order tracking picture frame; and a matching subunit, configured to determine a matching situation between each ROI in the current to-be-processed frame and each ROI in the tracking result of the pre-order tracking picture frame, based on each of the intersection over union.

Further, the apparatus further includes: a processing type determination module, configured to determine a processing type of the current to-be-processed frame according to a detection and tracking strategy; and a detection tracking determination module, configured to determine that the current to-be-processed frame is the detection picture frame or the tracking picture frame, based on the processing type; where, the processing type includes a detection type and a tracking type.

Further, the processing type determination module includes: a detection type determination unit, configured to determine that the processing type of the current to-be-processed frame is the detection type, in response to a frame interval between the current to-be-processed frame and a previous detection picture frame being a set number threshold; and a tracking type determination unit, configured to determine that the processing type of the current to-be-processed frame is the tracking type, in response to the frame interval between the current to-be-processed frame and the previous detection picture frame being not the set number threshold.

Further, the processing type further includes a skip type; correspondingly, the apparatus further includes: a skip module, configured to, after determine the processing type of the current to-be-processed frame according to the detection and tracking strategy, use a detection result of an ROI of a pre-order picture frame of the current to-be-processed frame as an ROI detection result of the current to-be-processed frame, in response to the current to-be-processed frame being of the skip type.

Further, the processing type determination module includes: a difference degree determination unit, configured to determine a degree of difference between the pre-order picture frame of the current to-be-processed frame and the current to-be-processed frame; and a skip type determination unit, configured to determine that the processing type of the current to-be-processed frame is the skip type, in response to the degree of difference being less than a set difference degree threshold.

Further, the difference degree determination unit includes: a difference degree determination subunit, configured to determine a histogram distance between the pre-order picture frame of the current to-be-processed frame and the current to-be-processed frame, and use the histogram distance as the degree of difference.

Further, the apparatus further includes: a smoothing processing module, configured to, after detect or track the current to-be-processed frame, perform smoothing processing on the detection result or the tracking result of the ROI of the current to-be-processed frame, based on a detection result or a tracking result of an ROI of an adjacent picture frame of the current to-be-processed frame.

Further, the smoothing processing module includes: a weight determination unit, configured to determine a weight of each adjacent picture frame, based on a frame spacing between the adjacent picture frame of the current to-be-processed frame and the current to-be-processed frame; and a smoothing processing unit, configured to perform smoothing processing on the detection result or the tracking result of the ROI of the current to-be-processed frame, based on the weight of each adjacent picture frame and a detection result or a tracking result of an ROI of each adjacent picture frame.

Further, the apparatus further includes: a validity verification module, configured to perform validity verification on the tracking result of the pre-order tracking picture frame based on the ROI in the current to-be-processed frame, in response to the current to-be-processed frame being the detection picture frame.

Further, the validity verification module includes: an ROI matching unit, configured to match the ROI in the current to-be-processed frame with an ROI in a tracking result of an adjacent historical tracking picture frame; a confidence acquisition unit, configured to acquire a confidence of the tracking result of each of the pre-order tracking picture frame, in response to that the matching fails; and a verification unit, configured to verify the tracking result of each of the pre-order tracking picture frame, based on the confidence.

Further, the apparatus further includes: a bite rate allocation module, configured to allocate different bite rates for the ROI and a non-ROI in the current to-be-processed frame; where a bite rate of the ROI is greater than a bite rate of the non-ROI; and an encoding module, configured to encode the current to-be-processed frame based on an allocated bite rate.

The above apparatus for detecting a region of interest in a video may perform the method for detecting a region of interest in a video provided by any embodiment of the present disclosure, and has the corresponding functional modules and beneficial effects for performing the method for detecting a region of interest in a video.

According to an embodiment of the present disclosure, the present disclosure further provides an electronic device and a readable storage medium.

Figure 6:
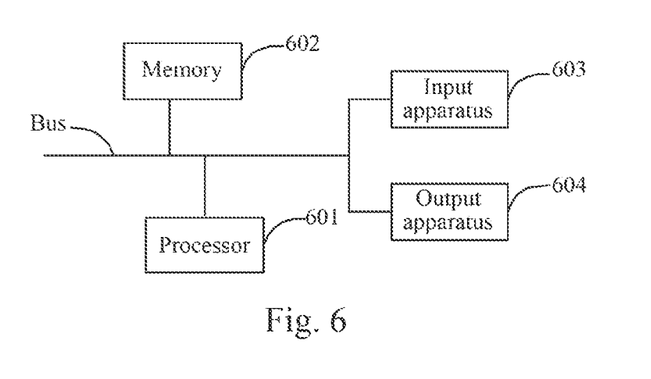
FIG. 6 is a block diagram of an electronic device used to implement the method for detecting a region of interest in a video according to an embodiment of the present disclosure.

As shown in FIG. 6, which is a block diagram of an electronic device of a method for detecting a region of interest in a video according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for detecting a region of interest in a video provided by the present disclosure. The non-transitory computer readable storage medium of the present disclosure stores computer instructions for causing a computer to perform the method for detecting a region of interest in a video provided by the present disclosure.

The memory 602, as a non-transitory computer readable storage medium, may be used to store non-transitory software programs, non-transitory computer executable programs and modules, such as program instructions/modules corresponding to the method for processing parking in the embodiments of the present disclosure (for example, the acquisition module 501, detection module 502, update module 503, and tracking module 504 shown in FIG. 5). The processor 601 executes the non-transitory software programs, instructions, and modules stored in the memory 602 to execute various functional applications and data processing of the server, that is, to implement the method for detecting a region of interest in a video in the foregoing method embodiment.

The memory 602 may include a storage program area and a storage data area, where the storage program area may store an operating system and at least one functionality required application program; and the storage data area may store data created by the use of the electronic device according to the method for detecting a region of interest in a video, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for detecting a region of interest in a video through a network. Examples of the above network include but are not limited to the Internet, intranet, local area network, mobile communication network, and combinations thereof.

The electronic device of the method for detecting a region of interest in a video may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, the embodiments of the present disclosure acquire the current to-be-processed frame from the picture frame sequence of the video; detect the ROI in the current to-be-processed frame, in response to determining that the current to-be-processed frame is the detection picture frame, to determine at least one ROI in the current to-be-processed frame; and update the to-be-tracked ROI, based on the ROI in the current to-be-processed frame and the tracking result determined by the pre-order tracking picture frame; and track the current to-be-processed frame based on the existing to-be-tracked ROI, in response to determining that the current to-be-processed frame is the tracking picture frame, to determine at least one tracking result as the ROI of the current to-be-processed frame. The above technical solution uses the ROI detection result of the detection picture frame and the ROI tracking result of the pre-order tracking picture frame of the detection picture frame in the video to correct the to-be-tracked ROI, therefore, mismatch between the ROI tracking result and the ROI detection result is avoided, and the situation that missed tracking of a newly added ROI or false tracking of a disappeared ROI is avoided, thereby improving the accuracy of the ROI detection result. Because some picture frames use ROI detection to determine the ROI, and some other picture frames use object tracking to determine the ROI, the occupation of image processing computing resources by the detection algorithm may be reduced, and an ROI detection speed can be improved.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure

What is claimed is:

1. A method for detecting a region of interest (ROI) in a video, the method comprising:
   acquiring a current to-be-processed frame from a picture frame sequence of a video;
   determining whether the current to-be-processed frame is a detection picture frame or a tracking picture frame, wherein the detection picture frame represents performing subsequent ROI detection on this type of picture frame, and the tracking picture frame represents performing subsequent object tracking on this type of picture frame;
   detecting an ROI in the current to-be-processed frame, in response to determining that the current to-be-processed frame is the detection picture frame, to determine at least one ROI in the current to-be-processed frame; and updating a to-be-tracked ROI, based on the ROI in the current to-be-processed frame and a tracking result determined by a pre-order tracking picture frame; and
   tracking the current to-be-processed frame based on a previously determined to-be-tracked ROI, in response to determining that the current to-be-processed frame is the tracking picture frame, to determine at least one tracking result as the ROI of the current to-be-processed frame;
   wherein the updating a to-be-tracked ROI, based on the ROI in the current to-be-processed frame and a tracking result determined by a pre-order tracking picture frame, comprises:
   determining an intersection over union of the ROI in the current to-be-processed frame and the ROI in the tracking result of the pre-order tracking picture frame;
   determining a matching result between each ROI in the current to-be-processed frame and each ROI in the tracking result of the pre-order tracking picture frame, based on each of the intersection over union; and
   updating the to-be-tracked ROI, based on the matching result.

2. The method according to claim 1, wherein the updating the to-be-tracked ROI, based on a matching result, comprises:
   adding the current ROI to the to-be-tracked ROI, in response to the current ROI in the current to-be-processed frame failing to match each ROI in the tracking result of the pre-order tracking picture frame;
   keeping the to-be-tracked ROI unchanged, in response to the current ROI in the current to-be-processed frame being successfully matched with any ROI in the tracking result of the pre-order tracking picture frame; and
   deleting the current ROI from the to-be-tracked ROI, in response to the current ROI in the tracking result of the pre-order tracking picture frame failing to match each ROI in the current to-be-processed frame.

3. The method according to claim 1, wherein the method further comprises:
   determining a processing type of the current to-be-processed frame according to a detection and tracking strategy; and
   determining that the current to-be-processed frame is the detection picture frame or the tracking picture frame, based on the processing type;
   wherein, the processing type comprises a detection type and a tracking type.

4. The method according to claim 3, wherein the determining a processing type of the current to-be-processed frame according to a detection and tracking strategy, comprises:
   determining that the processing type of the current to-be-processed frame is the detection type, in response to a frame interval between the current to-be-processed frame and a previous detection picture frame being a set number threshold; and
   determining that the processing type of the current to-be-processed frame is the tracking type, in response to the frame interval between the current to-be-processed frame and the previous detection picture frame being not the set number threshold.

5. The method according to claim 3, wherein the processing type further comprises a skip type; and after determining the processing type of the current to-be-processed frame according to the detection and tracking strategy, the method further comprises:
   using a detection result of an ROI of a pre-order picture frame of the current to-be-processed frame as an ROI detection result of the current to-be-processed frame, in response to the current to-be-processed frame being of the skip type.

6. The method according to claim 5, wherein, the determining a processing type of the current to-be-processed frame according to the detection and tracking strategy, comprises:
   determining a degree of difference between the pre-order picture frame of the current to-be-processed frame and the current to-be-processed frame; and
   determining that the processing type of the current to-be-processed frame is the skip type, in response to the degree of difference being less than a set difference degree threshold.

7. The method according to claim 6, wherein, the determining a degree of difference between the pre-order picture frame of the current to-be-processed frame and the current to-be-processed frame, comprises:
   determining a histogram distance between the pre-order picture frame of the current to-be-processed frame and the current to-be-processed frame, and using the histogram distance as the degree of difference.

8. The method according to claim 1, wherein, after detecting or tracking the current to-be-processed frame, the method further comprises:
   performing smoothing processing on the detection result or the tracking result of the ROI of the current to-be-processed frame, based on a detection result or a tracking result of an ROI of an adjacent picture frame of the current to-be-processed frame.

9. The method according to claim 8, wherein, the performing smoothing processing on the detection result or the tracking result of the ROI of the current to-be-processed frame, based on a detection result or a tracking result of an ROI of an adjacent picture frame of the current to-be-processed frame, comprises:

determining a weight of each adjacent picture frame, based on a frame spacing between the adjacent picture frame of the current to-be-processed frame and the current to-be-processed frame; and performing smoothing processing on the detection result or the tracking result of the ROI of the current to-be-processed frame, based on the weight of each adjacent picture frame and a detection result or a tracking result of an ROI of each adjacent picture frame.

10. The method according to claim 1, wherein the method further comprises:

performing validity verification on the tracking result of the pre-order tracking picture frame based on the ROI in the current to-be-processed frame, in response to the current to-be-processed frame being the detection picture frame.

11. The method according to claim 10, wherein, the performing validity verification on the tracking result of the pre-order tracking picture frame based on the ROI in the current to-be-processed frame, comprises:

matching the ROI in the current to-be-processed frame with an ROI in a tracking result of an adjacent historical tracking picture frame;

acquiring a confidence of the tracking result of each of the pre-order tracking picture frame, in response to that the matching fails; and verifying the tracking result of each of the pre-order tracking picture frame, based on the confidence.

12. The method according to claim 1, wherein the method further comprises:

allocating different bite rates for the ROI and a non-ROI in the current to-be-processed frame; wherein a bite rate of the ROI is greater than a bite rate of the non-ROI; and encoding the current to-be-processed frame based on an allocated bite rate.

13. An electronic device, comprising:

at least one processor; and a memory, communicatively connected to the at least one processor;

wherein the memory stores instructions executable by the at least one processor, the instructions, when executed by the at least one processor, cause the at least one processor to perform operations, the operations comprising:

acquiring a current to-be-processed frame from a picture frame sequence of a video;

determining whether the current to-be-processed frame is a detection picture frame or a tracking picture frame, wherein the detection picture frame represents performing subsequent ROI detection on this type of picture frame, and the tracking picture frame represents performing subsequent object tracking on this type of picture frame;

detecting a region of interest (ROI) in the current to-be-processed frame, in response to determining that the current to-be-processed frame is the detection picture frame, to determine at least one ROI in the current to-be-processed frame; and updating a to-be-tracked ROI, based on the ROI in the current to-be-processed frame and a tracking result determined by a pre-order tracking picture frame; and tracking the current to-be-processed frame based on a previously determined to-be-tracked ROI, in response to determining that the current to-be-processed frame is the tracking picture frame, to determine at least one tracking result as the ROI of the current to-be-processed frame;

wherein the updating a to-be-tracked ROI, based on the ROI in the current to-be-processed frame and a tracking result determined by a pre-order tracking picture frame, comprises:

determining an intersection over union of the ROI in the current to-be-processed frame and the ROI in the tracking result of the pre-order tracking picture frame;

determining a matching result between each ROI in the current to-be-processed frame and each ROI in the tracking result of the pre-order tracking picture frame, based on each of the intersection over union; and updating the to-be-tracked ROI, based on the matching result.

14. The electronic device according to claim 13, wherein the updating the to-be-tracked ROI, based on a matching result, comprises:

adding the current ROI to the to-be-tracked ROI, in response to the current ROI in the current to-be-processed frame failing to match each ROI in the tracking result of the pre-order tracking picture frame;

keeping the to-be-tracked ROI unchanged, in response to the current ROI in the current to-be-processed frame being successfully matched with any ROI in the tracking result of the pre-order tracking picture frame; and deleting the current ROI from the to-be-tracked ROI, in response to the current ROI in the tracking result of the pre-order tracking picture frame failing to match each ROI in the current to-be-processed frame.

15. The electronic device according to claim 13, wherein the operations further comprise:

determining a processing type of the current to-be-processed frame according to a detection and tracking strategy; and determining that the current to-be-processed frame is the detection picture frame or the tracking picture frame, based on the processing type;

wherein, the processing type comprises a detection type and a tracking type.

16. A non-transitory computer readable storage medium, storing computer instructions, wherein the computer instructions, when executed by a processor, cause the processor to perform operations, the operations comprising:

acquiring a current to-be-processed frame from a picture frame sequence of a video;

determining whether the current to-be-processed frame is a detection picture frame or a tracking picture frame, wherein the detection picture frame represents performing subsequent ROI detection on this type of picture frame, and the tracking picture frame represents performing subsequent object tracking on this type of picture frame;

detecting a region of interest (ROI) in the current to-be-processed frame, in response to determining that the current to-be-processed frame is the detection picture frame, to determine at least one ROI in the current to-be-processed frame; and updating a to-be-tracked ROI, based on the ROI in the current to-be-processed frame and a tracking result determined by a pre-order tracking picture frame; and tracking the current to-be-processed frame based on a previously determined to-be-tracked ROI, in response to determining that the current to-be-processed frame is the tracking picture frame, to determine at least one tracking result as the ROI of the current to-be-processed frame;
wherein the updating a to-be-tracked ROI, based on the ROI in the current to-be-processed frame and a tracking result determined by a pre-order tracking picture frame, comprises:
determining an intersection over union of the ROI in the current to-be-processed frame and the ROI in the tracking result of the pre-order tracking picture frame;
determining a matching result between each ROI in the current to-be-processed frame and each ROI in the tracking result of the pre-order tracking picture frame, based on each of the intersection over union; and
updating the to-be-tracked ROI, based on the matching result.

* * * * *